United States Patent
Tan

(10) Patent No.: US 11,462,904 B2
(45) Date of Patent: Oct. 4, 2022

(54) APPARATUS FOR PROTECTION AGAINST ELECTROSTATIC DISCHARGE AND METHOD OF MANUFACTURING THE SAME

(71) Applicant: Hangzhou Geo-chip Technology Co., Ltd., Hangzhou (CN)

(72) Inventor: Chun Geik Tan, San Diego, CA (US)

(73) Assignee: Hangzhou Geo-Chip Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/153,291

(22) Filed: Jan. 20, 2021

(65) Prior Publication Data

US 2022/0231501 A1 Jul. 21, 2022

(51) Int. Cl.
 *H02H 9/04* (2006.01)
 *H05F 3/02* (2006.01)

(52) U.S. Cl.
 CPC ............... *H02H 9/046* (2013.01); *H05F 3/02* (2013.01)

(58) Field of Classification Search
 CPC .................................. H02H 9/046; H05F 3/02
 USPC ............................................................ 361/56
 See application file for complete search history.

(56) References Cited

U.S. PATENT DOCUMENTS

| | | | | |
|---|---|---|---|---|
| 2004/0075964 A1* | 4/2004 | Ker | .................... | H01L 27/0251 361/113 |
| 2005/0184344 A1* | 8/2005 | Ker | ........................ | H01L 24/06 257/360 |
| 2011/0051301 A1* | 3/2011 | Thijs | .................... | H01L 27/0285 361/57 |
| 2011/0267725 A1* | 11/2011 | Scuderi | ............... | H01L 27/0255 361/56 |
| 2012/0019968 A1* | 1/2012 | Hsieh | .................. | H01L 27/0288 361/56 |
| 2012/0176708 A1* | 7/2012 | Tsai | ..................... | H01L 27/0255 438/510 |
| 2012/0176709 A1* | 7/2012 | Tsai | ......................... | H03F 1/52 29/825 |
| 2013/0114172 A1* | 5/2013 | Huang | ................... | H02H 9/046 361/56 |
| 2014/0268447 A1* | 9/2014 | Gudem | ............... | H01L 27/0255 361/56 |
| 2014/0307355 A1* | 10/2014 | Tsai | ........................ | H03F 3/195 361/56 |

(Continued)

*Primary Examiner* — Dharti H Patel
(74) *Attorney, Agent, or Firm* — McDonnell Boehnen Hulbert & Berghoff LLP

(57) ABSTRACT

The present disclosure discloses an apparatus for protection against electrostatic discharge and a method of manufacturing the same. The apparatus comprises: a first input/output pad electrically connected to an input/output pin and comprising an input/output protection circuit provided between a power source line and a ground line, wherein the input/output protection circuit is configured to release an electrostatic discharge current generated at the input/output pin; and a second input/output pad which is an empty pad electrically connected to the input/output pin and an RF input/output terminal of an internal RF circuit and is configured to receive a signal from the input/output pin and transmit the signal to the internal RF circuit. With the above apparatus, parasitic capacitive load can be minimized while electrostatic protection is performed on the RF circuit.

7 Claims, 2 Drawing Sheets

(56) References Cited

U.S. PATENT DOCUMENTS

2017/0194786 A1\* 7/2017 Tzeng .................... H02H 9/041
2020/0235571 A1\* 7/2020 Concannon ............ H03H 11/02

\* cited by examiner

APPARATUS FOR PROTECTION AGAINST ELECTROSTATIC DISCHARGE AND METHOD OF MANUFACTURING THE SAME

TECHNICAL FIELD

The present disclosure relates to the field of integrated circuit design technologies, and in particular, to an apparatus for protection against electrostatic discharge and a method of manufacturing the same.

BACKGROUND

This section intends to provide a background or context to the embodiments of the present disclosure stated in the claims, and the description here should not be construed as the prior art just because it is included in this section.

As electronic elements become smaller and smaller, many integrated circuits tend to be damaged by electrostatic discharge (ESD). Generally, electrostatic discharge (ESD) current refers to the current generated instantaneously between two charged objects due to contact, short circuit or dielectric breakdown. An ESD event may occur during the manufacturing of an electronic device. For example, a mechanical or manual operation may cause ESD charge or discharge, whereby the internal circuit may be permanently damaged.

An ESD protection circuit may be employed to protect a circuit from ESD events, thereby preventing failure or breakdown of the electronic device. However, most ESD protection circuits usually introduce a lot of parasitic capacitance. Such parasitic capacitance may substantially lower the performance of a radio frequency (RF) circuit.

Therefore, it has become an urgent problem how to implement ESD protection on a sensitive RF circuit while minimizing the parasitic capacitance load.

SUMMARY

In view of the above problem in the prior art, an apparatus for protection against electrostatic discharge and a method of manufacturing the same are proposed to perform electrostatic protection on an RF circuit while minimizing the parasitic capacitance in the circuit.

The present disclosure provides the following solutions.

In a first aspect of the present disclosure, there provides an apparatus for protection against electrostatic discharge, including: a first input/output pad electrically connected to an input/output pin and including an input/output protection circuit provided between a power source line and a ground line, where the input/output protection circuit is configured to release an electrostatic discharge current generated at the input/output pin; and a second input/output pad which is an empty pad electrically connected to the input/output pin and an RF input/output terminal of an internal RF circuit and is configured to receive a signal from the input/output pin and transmit the signal to the internal RF circuit.

In one embodiment, the apparatus further includes a power source pad and a ground pad, where the power source pad is electrically connected to a power source pin and an input terminal of the internal RF circuit, and is provided with a power source protection circuit; and/or, the ground pad is electrically connected to a ground pin and an output terminal of the internal RF circuit, and is provided with a ground protection circuit.

In one embodiment, during packaging and bonding processes of the apparatus, after the first input/output pad is firstly bonded to the input/output pin, the second input/output pad is bonded to the input/output pin.

In one embodiment, the input/output protection circuit includes: a first diode having an anode electrically connected to the input/output pin and a cathode electrically connected to the power source line, where the first diode is configured to provide a first diversion path for the electrostatic discharge current generated at the input/output pin; and a second diode having a cathode electrically connected to the input/output pin and an anode connected to the ground line, where the second diode is configured to provide a second diversion path for the electrostatic discharge current generated at the input/output pin, the second diversion path being opposite to the first diversion path.

In one embodiment, each of the power source protection circuit and the ground protection circuit includes: a clamp diode having an anode connected to the ground line and a cathode connected to the power source line; and a clamp circuit including: an RC series circuit connected to the power source line and the ground line; an inverter circuit connected to the RC series circuit, the power source line and the ground line; and an N-type releasing transistor connected to the inverter circuit, the power source line and the ground line.

In one embodiment, the first input/output pad and the second input/output pad are each bonded to the input/output pin via respective bonding wires for electrical connection.

In one embodiment, the input/output protection circuit is arranged under the first input/output pad; the power source protection circuit is arranged under the power source pad, and the ground protection circuit is arranged under the ground pad.

In a second aspect, there provides a method of manufacturing an apparatus for protection against electrostatic discharge, which includes providing an apparatus according to any one embodiment of the first aspect, where during packaging and bonding processes of the apparatus, after the first input/output pad is bonded to the input/output pin, the input/output pin is bonded to the second input/output pad.

By employing at least one of the above technical solutions, the embodiments of the present disclosure can achieve the beneficial effects below: in the embodiments, an empty pad is provided between an input/output pin and an internal RF circuit for signal transmission, and the input/output pin is further electrically connected to another pad including an ESD protection circuit, thereby significantly reducing the parasitic capacitive load of the RF circuit while ESD protection is performed on the RF circuit.

It should be understood that, the above illustration is merely an overview of the technical solutions of the present disclosure for more clearly understanding the technical means of the present disclosure, so that the present disclosure may be implemented according to the contents of the description. To make the above and other objects, features and advantages of the present disclosure more apparent, specific embodiments of the present disclosure will be illustrated below by examples.

BRIEF DESCRIPTION OF THE DRAWINGS

By reading the detailed description of the exemplary embodiments below, one skilled in the art will understand the advantages and benefits described herein as well as other advantages and benefits. The drawings are only for the purpose of illustrating the exemplary embodiments, rather than being construed as limitations to the present disclosure.

In the drawings, the same or corresponding reference numerals indicate the same or corresponding elements.

DETAILED DESCRIPTION

Figure 1:
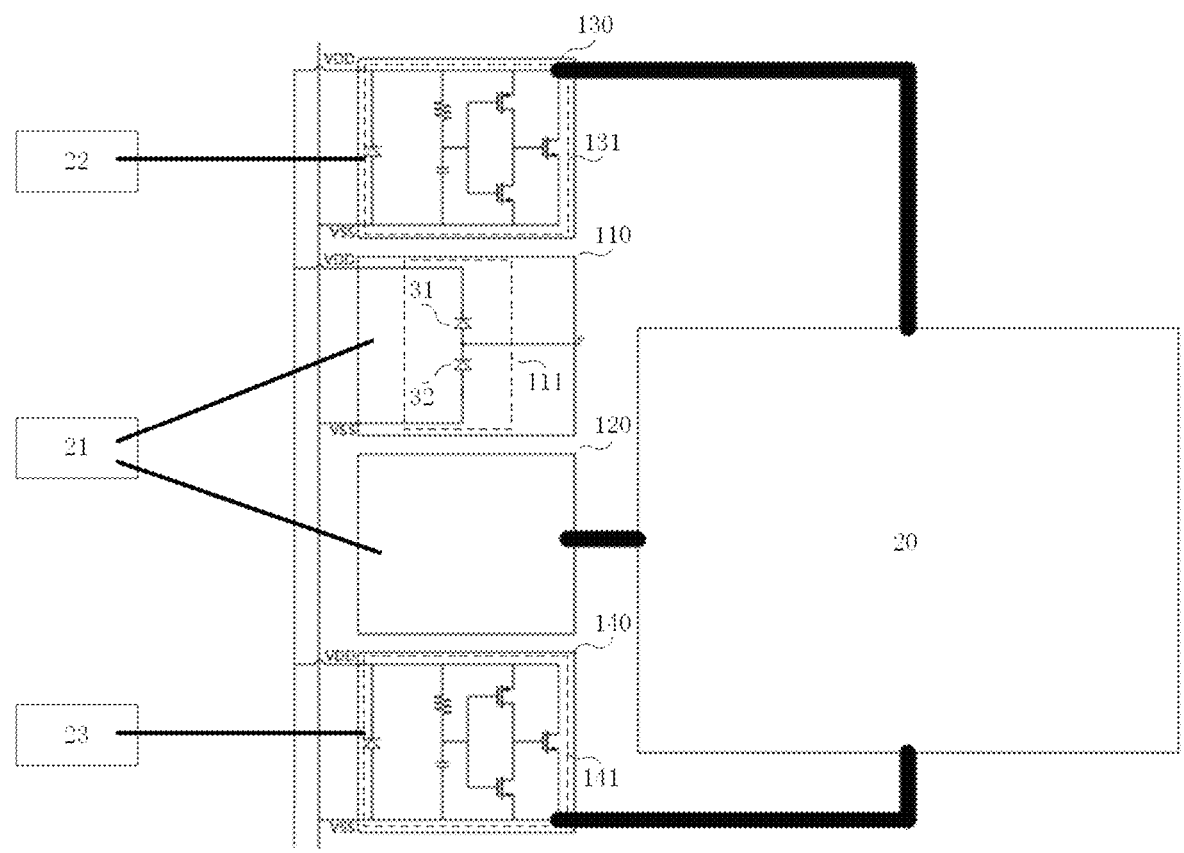
FIG. 1 is a schematic structural diagram of an apparatus for electrostatic discharge (ESD) protection according to an embodiment of the present disclosure.

Exemplary embodiments of the present disclosure will be described in more detail hereinafter with reference to the accompanying drawings. Although exemplary embodiments of the present disclosure are shown in the drawings, it should be understood that the present disclosure may be implemented in various forms, and should not be limited by the embodiments set forth herein. On the contrary, these embodiments are provided for more thoroughly understanding the present disclosure and to more fully convey the scope of the present disclosure to those skilled in the art.

Therefore, the following detailed description of the embodiments of the present disclosure provided in the drawings is not intended to limit the protection scope of the present disclosure, but merely represents the embodiments selected in the present disclosure. All other embodiments obtained by one skilled in the art based on the embodiments of the present disclosure without creative effort shall pertain to the protection scope of the present disclosure.

In the description of the present disclosure, it should be noted that, unless otherwise expressly specified and defined, the terms "arranged", "connected" and the like should be understood in a broad sense, and may refer to, for example, a fixed or detachable or integral connection, a mechanical or electrical connection, a direct connection or an indirect connection through an intermediate medium, or a communication between interiors of two elements. In addition, the term "coupled" herein includes any direct or indirect electrical connecting means. The specific meanings of the above terms in the present disclosure may be understood by those skilled in the art depending on the specific context.

Moreover, it should be noted that the embodiments of the present disclosure and the features in the embodiments may be combined with each other in the case of no confliction. The present disclosure will be illustrated in detail hereinafter with reference to the drawings and in conjunction with the embodiments.

An apparatus for electrostatic discharge (ESD) protection according to the present disclosure will be described in detail below with reference to FIG. 1.

As shown in FIG. 1, there provides an apparatus for electrostatic discharge (ESD) protection, which may be applied to an integrated circuit chip including an internal RF circuit, with a plurality of pads provided around the internal RF circuit. The apparatus for electrostatic discharge (ESD) protection according to the present disclosure specifically includes:

a first input/output pad 110 electrically connected to an input/output pin (I/O pin) 21 and including an input/output protection circuit 111 provided between a power source line VDD and a ground line VSS, where the input/output protection circuit 111 is an electrostatic discharge (ESD) protection circuit configured to release an electrostatic discharge current generated at the input/output pin 21; and a second input/output pad 120 which is an empty pad functioning as a conducting element and has one end electrically connected to the input/output pin 21 and the other end electrically connected to an RF input/output terminal of an internal RF circuit 20, where the second input/output pad 120 is configured to receive an input signal from the input/output pin 21 and transmit the input signal to the internal RF circuit 20.

The term "empty pad" herein generally refers to an input/output pad without any protection circuit therein.

Referring to FIG. 1, the operating principle of the protection against electrostatic discharge according to the present disclosure is as follows:

In a normal state, an ESD protection element (for example, a diode) in the input/output protection circuit 111 is in a cut-off state, and a signal is sent from the input/output pin 21 and then transmitted to the RF input/output terminal (RF I/O) of the internal RF circuit 20 via the second input/output pad 120, whereby a normal operation is performed.

When an electrostatic discharge (ESD) event occurs at the input/output pin 21, an electrostatic pulse is generated at the input/output pin 21, and an ESD current is transmitted to the power source line VDD via a first diode 31 in the input/output protection circuit 111 or transmitted to the ground line VSS a second diode 32 in the input/output protection circuit 111, whereby the ESD current is released to protect the internal RF circuit 20 from the ESD event, thereby preventing failure or breakdown of the electronic device.

It can be understood that, most ESD protection circuits usually introduce a lot of parasitic capacitance, which may substantially lower the performance of the internal radio frequency (RF) circuit. Therefore, the internal RF circuit 20 needs to a trade-off between the ESD protection performance and the circuit performance. Assuming that, in the case of the prior art, the parasitic capacitance of the diode in the input/output protection circuit 111 is $C_{dio}$, the ESD grounding impedance presented to the internal RF circuit 20 would be $Z=(-1)/(2\pi*C_{dio})$. However, in the case of this embodiment, the ESD grounding impedance presented to the RF circuit is $Z=(-1)/(2\pi*C_{dio})+2\pi*L_{bond}$, where $L_{bond}$ is parasitic inductance. Essentially, the parasitic capacitive load for the RF circuit can be significantly reduced.

In one embodiment, the apparatus for electrostatic discharge (ESD) protection according to the present disclosure further includes: a power source pad 130 and a ground pad 140.

The power source pad 130 is connected to the power source pin 22 and the input terminal of the internal RF circuit 20, and the power source line VDD is connected to the power source pad 130 for providing a supply voltage. In order to prevent possible electrostatic discharge (ESD) events occurring at the power source pin 22 from damaging the internal RF circuit 20, the power source pad 130 is further provided with a power source protection circuit 131 for releasing the electrostatic discharge current generated at the power source pin 22.

Additionally or alternatively, the ground pad 140 is connected to the ground pin 23 and the output terminal of the internal RF circuit 20, and the ground line VSS is connected to the ground pad 140 for providing a ground voltage. In order to prevent possible electrostatic discharge (ESD) events occurring at the ground pin 23 from damaging the internal RF circuit 20, the ground pad 140 is further provided with a ground protection circuit 141 for releasing the electrostatic discharge current generated at the ground pin 23.

In the case as shown in FIG. 1, it can be understood that, when ESD strikes any pin of the chip, a large voltage would be coupled to the power source line VDD, and the above power source protection circuit 131 or ground protection circuit 141 is configured to release the electrostatic discharge (ESD) current generated at any pin. For example, when a positive electrostatic pulse is generated at the input/output pin 21, the positive electrostatic pulse would turn on the first diode 31 in the input/output protection circuit 111, and the voltage of the power source line VDD would be pulled up by the turned-on first diode 31, thereby releasing the ESD current via the power source pad 130 and the ground pad 140.

In one embodiment, during packaging and bonding processes of the apparatus, after the first input/output pad 110 and the input/output pin 21 are bonded, the second input/output pad 120 is bonded to the input/output pin 21. It should be understood that, electrostatic discharge (ESD) events are very prone to occur in the manufacturing and packaging processes of the above apparatus. In this embodiment, since the input/output pin 21 is firstly connected to the first input/output pad 110 carrying the input/output protection circuit 111, the input/output pin 21 can always "see" a circuit for electrostatic discharge (ESD) protection (for example, a diode), thus even if an electrostatic discharge (ESD) event occurs in the manufacturing and packaging processes, the electrostatic discharge (ESD) current can be released via the input/output protection circuit 111 (for example, via the diode). Therefore, the internal RF circuit 20 can be protected during the manufacturing process.

On the contrary, assuming that the input/output pin 21 is firstly bonded to the second input/output pad 120, an electrostatic discharge (ESD) event may occur at the moment of bonding, and thus the internal RF circuit 20 may be burnt out.

In one embodiment, the input/output protection circuit 111 includes a first diode 31 and a second diode 32.

The first diode 31 has an anode coupled to the input/output pin 21 via the first input/output pad 110, and a cathode electrically connected to the power source line VDD. The first diode 31 is configured to provide a first diversion path for the electrostatic discharge current generated at the input/output pin 21, and specifically, the first diode 31 is configured to provide a release path for the positive electrostatic pulse generated at the input/output pin 21. In the case as shown in FIG. 1, the first diversion path is grounded from the first diode 31 via the power source protection circuit 131 in the power source pad 130.

The second diode 32 has a cathode electrically connected to the input/output pin 21 (i.e., coupled to the anode of the first diode 31), and an anode electrically connected to the ground line VSS. The second diode 32 is configured to provide a second diversion path for the electrostatic discharge current generated at the input/output pin 21, and specifically, the second diode 32 is configured to provide a release path for the negative electrostatic pulse generated at the input/output pin 21.

In this embodiment, an ESD protection circuit consisting of diodes is employed as the input/output protection circuit 111, whereby not only excessive parasitic capacitance is prevented from being introduced, but also the positive high voltage applied to the input/output pin 21 is diverted to the power source protection circuit 131 of the power source pad 130, and the negative high voltage is diverted to the ground protection circuit 141 in the ground pad 140.

In another embodiment, the input/output protection circuit 111 may also include more than two diodes, which is not specifically defined in the present disclosure.

Figure 2:
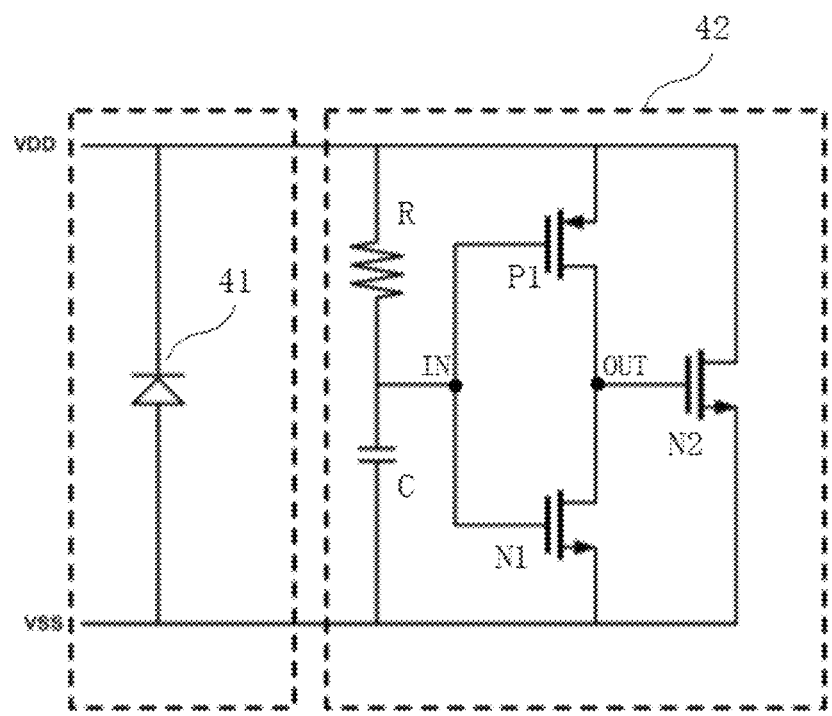
FIG. 2 is a schematic diagram of a power source protection circuit/ground protection circuit according to an embodiment of the present disclosure.

FIG. 2 is a schematic diagram of a power source protection circuit 131/ground protection circuit 141 according to an embodiment of the present disclosure. The power source protection circuit 131 and the ground protection circuit 141 will be described in detail below with reference to FIG. 2.

In one embodiment, each of the power source protection circuit 131 and the ground protection circuit 141 includes a clamp diode 41 and a clamp circuit 42.

The clamp diode 41 has an anode connected to the ground line VSS, and a cathode connected to the power source line VDD. When a high voltage generated from ESD is applied to the ground line VSS, the clamp diode 41 is turned on, and the high voltage is leaked to the power source line VDD.

The clamp circuit 42 includes: an RC (resistance-capacitance) series circuit connected to the power source line VDD and the ground line VSS, where the RC series circuit includes a resistive element R connected in series between the power source line VDD and the ground line VSS, and a capacitive element C functioning as a capacitive load; an inverter circuit connected to the RC series circuit, the power source line VDD and the ground line VSS, where the inverter circuit is a complementary metal oxide-semiconductor (CMOS) inverter formed by the complementary arrangement of a P-type transistor P1 and an N-type transistor N1, that is, in the inverter circuit, the gates of the P-type transistor P1 and the N-type transistor N1 are connected to each other with the connection point thereof set as an input node IN, and the drains of the P-type transistor P1 and the N-type transistor N1 are connected to each other with the connection point thereof set as an output node OUT, and the connection point of the resistive element R and the capacitive element C of the RC series circuit are connected to the input node IN; and an N-type releasing transistor N2 connected to the inverter circuit, the power source line VDD and the ground line VSS, where the N-type releasing transistor N2 has a gate connected to the output node OUT of the inverter circuit, a drain connected to the power source line VDD, and a source connected to the ground line VSS, and is configured to provide a low resistance release path between the power source and the ground when an ESD strike is sensed, thereby bleeding the electrostatic charge in time.

In the examples shown in FIG. 1 and FIG. 2, during the normal power-on process of the circuit, since the rise time of the VDD voltage is much greater than the time constant of the RC series circuit, the capacitive element C can be charged by the power source line VDD in time, and the input node IN presents a high level. Through the coupling of the inverter circuit, the output node OUT is in a low-level state, so that the N-type releasing transistor N2 is strictly turned off. In the case that ESD strikes the power source line VDD, it can be understood that, when ESD strikes any pin of the chip, the large voltage would be coupled to the power source line VDD, and since the rise time of the ESD voltage is greater than the time constant of the RC series circuit, the rise speed of the voltage on the power source line VDD is much faster than that of the input node IN, and thus the capacitive element C cannot be charged in time, whereby the input node IN is at a low level. Under the action of the inverter circuit, the output node OUT is pulled up to a high level by the P-type transistor P1, so that the N-type releasing transistor N2 is turned on. In the turn-on state, the N-type releasing transistor N2 provides a low-resistance releasing channel, so that the ESD current can be effectively released.

On the other hand, at this moment, the voltage between VDD/VSS is clamped at a relatively low potential, which prevents the internal RF circuit from being in an overvoltage state and thus being damaged.

In another embodiment, the clamp diode and the clamp circuit may also have other structures, for example, more than two clamp diodes are included, for example, the clamp circuit includes two or more inverter circuits, which is not specifically defined in the present disclosure.

Therefore, in the power source protection circuit 131 and the ground protection circuit 141 with such configurations, if an ESD event is applied to the power source pin 22 or the ground pin 23, the power source protection circuit 131 or the ground protection circuit 141, under the above specific voltage as a trigger, operates in such a way that the potential difference between the power source line VDD and the ground line VSS is eliminated, thereby protecting the internal RF circuit 20.

In one embodiment, the first input/output pad 110 and the second input/output pad 120 are each bonded to the input/output pin 21 via respective bonding wires for electrical connection. The material of the bonding wires may be gold or copper.

In one embodiment, the input/output protection circuit 111 is arranged under the first input/output pad 110; the power source protection circuit 131 is arranged under the power source pad 130, and the ground protection circuit is arranged under the ground pad 140. It can be understood that, in comparison with arranging the pad and the protection circuit on the same plane, a more compact structure may be obtained by arranging the protection circuit under the pad.

The present disclosure further provides a method of manufacturing an apparatus for protection against electrostatic discharge, which specifically includes:

providing an apparatus according to any one of the above embodiments, where during packaging and bonding processes of the apparatus, after the first input/output pad 110 is bonded to an input/output pin 21, the input/output pin 21 is bonded to the second input/output pad 120.

It should be understood that, electrostatic discharge (ESD) events are also extremely prone to occur during the manufacturing and packaging processes of the above apparatus. In this embodiment, since the input/output pin 21 is firstly connected to the first input/output pad 110 carrying the input/output protection circuit 111, the input/output pin 21 can always "see" a circuit for electrostatic discharge (ESD) protection (for example, a diode), thus even if an electrostatic discharge (ESD) event occurs in the manufacturing and packaging processes, the electrostatic discharge (ESD) current can be released via the input/output protection circuit 111 (for example, via the diode). Therefore, the internal RF circuit 20 can be protected during the manufacturing process.

On the contrary, assuming that the input/output pin 21 is firstly bonded to the second input/output pad 120, an electrostatic discharge (ESD) event may occur at the moment of bonding, and thus the internal RF circuit 20 may be burnt out.

Apparently, various modifications and variations may be made to the present disclosure by one skilled in the art without departing from the spirit and scope of the present disclosure. Thus, if the modifications and variations fall within the scope of the claims of the present disclosure and their equivalents, the present disclosure is also intended to encompass these modifications and variations.

What is claimed is:

1. An apparatus for protection against electrostatic discharge, comprising:
    a first input/output pad electrically connected to an input/output pin and comprising an input/output protection circuit provided between a power source line and a ground line, wherein the input/output protection circuit is configured to release an electrostatic discharge current generated at the input/output pin; and
    a second input/output pad which is an empty pad electrically connected to the input/output pin and an RF input/output terminal of an internal RF circuit and is configured to receive a signal from the input/output pin and transmit the signal to the internal RF circuit,
    wherein the first input/output pad is electrically connected to the input/output pin via a first bonding wire and the second input/output pad is electrically connected to the input/output pin via a second bonding wire that is distinct from the first bonding wire.

2. The apparatus of claim 1, further comprising a power source pad and a ground pad, wherein:
    the power source pad is electrically connected to a power source pin and an input terminal of the internal RF circuit, and is provided with a power source protection circuit; and/or
    the ground pad is electrically connected to a ground pin and an output terminal of the internal RF circuit, and is provided with a ground protection circuit.

3. The apparatus of claim 2, wherein the input/output protection circuit comprises:
    a first diode, which has an anode electrically connected to the input/output pin and a cathode electrically connected to the power source line, and is configured to provide a first diversion path for the electrostatic discharge current generated at the input/output pin; and
    a second diode, which has a cathode electrically connected to the input/output pin and an anode connected to a ground line, and is configured to provide a second diversion path for the electrostatic discharge current generated at the input/output pin.

4. The apparatus of claim 2, wherein each of the power source protection circuit and the ground protection circuit comprises:
    a clamp diode having an anode connected to the ground line and a cathode connected to the power source line; and
    a clamp circuit comprising: an RC series circuit connected to the power source line and the ground line; an inverter circuit connected to the RC series circuit, the power source line and the ground line; and an N-type releasing transistor connected to the inverter circuit, the power source line and the ground line.

5. The apparatus of claim 2, wherein:
    the input/output protection circuit is arranged under the first input/output pad; and
    the power source protection circuit is arranged under the power source pad, and the ground protection circuit is arranged under the ground pad.

6. The apparatus of claim 1, wherein during packaging and bonding processes of the apparatus, after the first input/output pad and the input/output pin are bonded, the second input/output pad is bonded to the input/output pin.

7. A method of manufacturing an apparatus for protection against electrostatic discharge, the method comprising providing an apparatus of claim 1, wherein during packaging and bonding processes of the apparatus, after the first input/output pad is bonded to the input/output pin, the input/output pin is bonded to the second input/output pad.

\* \* \* \* \*